No. 608,797. Patented Aug. 9, 1898.
W. G. RUNYON.
SUPPORT FOR VERANDAS, PORCHES, &c.
(Application filed Mar. 16, 1897.)
(No Model.)
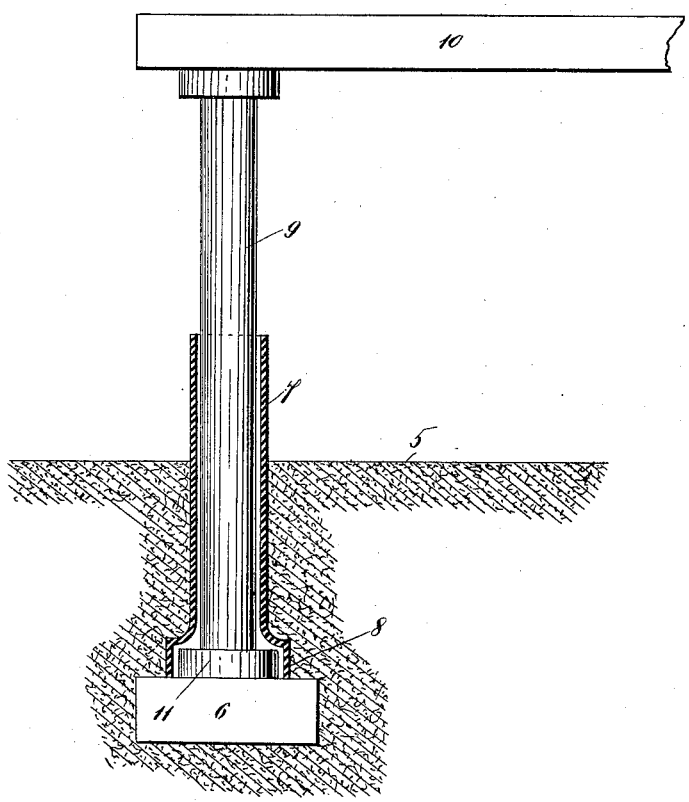
WITNESSES.
INVENTOR

UNITED STATES PATENT OFFICE.

WALTER G. RUNYON, OF ELIZABETH, NEW JERSEY.

SUPPORT FOR VERANDAS, PORCHES, &c.

SPECIFICATION forming part of Letters Patent No. 608,797, dated August 9, 1898.

Application filed March 16, 1897. Serial No. 627,835. (No model.)

*To all whom it may concern:*

Be it known that I, WALTER G. RUNYON, a citizen of the United States, residing at Elizabeth, in the county of Union and State of New Jersey, have invented certain new and useful Improvements in Supports for Verandas, Porches, and Similar Structures, of which the following is a full and complete specification, such as will enable those skilled in the art to which it appertains to make and use the same.

This invention relates to supports for verandas, porches, and other structures of this class; and the object thereof is to provide improved supports for such structures which will not be affected by the freezing of the ground.

It is a well-known fact that when the usual supports for verandas, porches, and similar structures which are connected with buildings are employed the freezing of the ground results in raising said supports, which drop again when the ground thaws, and this movement of the supports results in breaking loose the verandas or porches and disconnects the same from the building; and the object of the invention is to provide means for correcting this evil in structures of this class.

The invention is fully disclosed in the following specification, of which the accompanying drawing forms a part, said drawing being an end view of a portion of a veranda and the support thereof, said support being constructed according to my invention.

In the drawing forming part of this specification the separate parts of my improvement are designated by numerals of reference, and in said drawing I have shown at 5 the level of the ground, and in the practice of my invention I sink in the ground to a depth below the freezing-point a stone or other base support 6, on which I mount a casing 7, which projects upwardly through the ground. The casing 7 may be tubular or angular in cross-section or of any desired form, and the base thereof is preferably enlarged, as shown at 8, and in said drawing I have also shown at 9 a column which forms a support for the outer edge of the veranda, a part of which is shown at 10, and said column may be of any desired form, either cylindrical or angular in cross-section, and the lower end thereof is provided with a base 11, which rests upon the stone or other support 6 and which is inclosed by the enlarged lower end 8 of the casing 7. The casing 7 may be slipped over the upper end of the column or support 9 before said column or support is placed in the ground, and when said casing is in proper position the ground is packed around the same in the usual manner. The casing 7 is also preferably slightly larger in diameter than said column, and, if desired, it may extend nearly to the top thereof, and the column 9 and the veranda 10 may be connected in any desired manner.

As thus constructed it will be seen that the ground is only in contact with the casing 7, and the column 9 will not be affected by the freezing or thawing of said ground, and if the stone or support 6 is placed deep enough it will be apparent that the column 9 will be in no way affected by the freezing of the ground. The casing 7 rests upon the stone or support 6, and said support 6 may be composed of any desired material.

Any desired number of the columns 9 may be employed, and it will thus be seen that I accomplish the object of my invention by means of a device which is simple in construction and operation and also comparatively inexpensive, while being well adapted to produce the result for which it is intended.

I am aware that frost-protector arrangements have heretofore been employed in which a post or column has been mounted upon a foundation or base and surrounded by a tubular casing of greater diameter than the post, whereby the casing is permitted to contract and expand without affecting the post; but in such previous constructions the casings have been designed to slide upwardly during the "heaving" movement of the surrounding frozen earth, the object sought to be attained being that the casing will thus slide upwardly and leave the post intact. These previous constructions are manifestly impracticable, for the reason that when the casing slides upwardly from the foundation or base the earth will fill in under the lower end or edge of the casing and come in contact with the base of the post, and the casing cannot therefore possibly return to its normal position when the surrounding earth subsequently thaws. Such sliding casings have been provided with a smooth exterior or circumference without exterior projections, so that they would freely perform their sliding movement, any projections or means for retarding this movement being of course avoided.

My invention is designed to provide a material improvement upon the above-mentioned construction by avoiding any sliding movement of the casing or separation of the same from the foundation or base, and in carrying out this feature of a non-sliding protective casing surrounding the portion of the post below the ground-level I provide the casing with an enlargement at its exterior or circumference which projects laterally at the exterior and forms a ridge or shoulder upon and against which the packed earth is seated. The earth thus bearing down upon the exterior ridge or shoulder of the casing provides a lock which will prevent any movement of the casing from the base or foundation, but will not affect the contraction and expansion of the same independently of the inclosed protected post.

Having fully described my invention, I claim as new and desire to secure by Letters Patent—

An improved foundation-post and frost-protector therefor, comprising the foundation block or base set within the ground below the frost or freezing line, a supporting post or column mounted on said foundation block or base and extending upwardly above the ground-surface, and the tubular casing set upon the foundation block or base and extending upwardly therefrom through the ground to a point above the ground-surface and inclosing or surrounding the lower portion of the supporting-post, said tubular casing being of greater diameter than the inclosed portion of the post so that a free open space is provided between the post and casing, and the latter can contract and expand in an independent movement without affecting the normal position of the post, and the casing being provided with an enlarged portion extending laterally with respect to the exterior or circumference and forming an exterior ridge or shoulder above and against which the packed ground or earth is seated, whereby the casing is locked against an upward sliding movement from the foundation or base during the "heaving" movement of the surrounding earth, substantially as and for the purpose set forth.

In testimony that I claim the foregoing as my invention I have signed my name, in presence of the subscribing witnesses, this 15th day of March, 1897.

WALTER G. RUNYON.

Witnesses:
WILLIAM C. RUNYON,
CHARLES HOFF.